(12) United States Patent
Chandrasekhar

(10) Patent No.: US 6,262,411 B1
(45) Date of Patent: Jul. 17, 2001

(54) DIRECT DETECTION RECEIVER

(75) Inventor: Sethumadhavan Chandrasekhar, Matawan, NJ (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/365,943

(22) Filed: Aug. 2, 1999

(51) Int. Cl.$^7$ ...................................................... H01J 40/14
(52) U.S. Cl. ................................ 250/214 R; 250/214 LA
(58) Field of Search ......................... 250/214 R, 214 LA, 250/214 A, 214.1, 214 AG; 356/226, 218, 221, 223; 327/514

(56) References Cited

U.S. PATENT DOCUMENTS 5,892,220 * 4/1999 Woodward ........................ 250/214 R

* cited by examiner

*Primary Examiner*—Que T. Le

(57) ABSTRACT

A direct detector uses optical amplification and resistors to eliminate the need for linear electrical amplifiers. The receives evenly splits an input light wave along a clock path and a data recovery path. Along the clock path a first photodetector detects the light wave. The input power induces a current across a first resistor in series with the photodetector giving rise to a voltage V which becomes the input voltage to the cock recovery device. The output from the clock recovery device is then split by an optical power splitter with one output to a decision circuit and another output optionally available for external use. Along the data path the light wave is split a second time and each of the two resultant paths are detected by a photodetector in series with a resistor. The decision circuit has input pins from each of the photodetectors to provide the data signal and its average DC voltage in lieu of the complement of the data signal as inputs to the decision circuit. The decision circuit outputs the data and its average.

13 Claims, 2 Drawing Sheets

DIRECT DETECTION RECEIVER

FIELD OF THE INVENTION

The present invention relates generally to photodetector receivers and more particularly to a photodetector receiver which obviates the need for linear amplification.

BACKGROUND OF THE INVENTION

A prior art direct detector, is shown by way of example in FIG. 1. A direct detector detects the signal from variations in the signal amplitude, as opposed to variations in frequency. As shown, a light wave is incident at a photodetector 10, shown for purposes of illustration as a photodiode. The resulting electrical current output from detector 10 may pass through a pre-amplifier 20 such as shown, typically used to amplify the electrical signal to an intermediate level without degrading the signal to noise ratio of the signal. Thereafter, the signal is further amplified as it passes through post amplifier 30 for large amplification of the voltage for input to decision circuit 40. At this point the voltage is split along two paths. One path leads to a decision circuit 40 for data recovery, while the other path leads to a clock recovery device 50 for correcting the timing of the data signal which may have become distorted during transmission. The clock is split at power splitter 60 in order to provide timing information to decision circuit 40 and for external use.

The amplification stage after detection is necessary because the incident signal may be at a low power level on the order of 50 microwatts or lower, which will generate a low voltage on the order of 15 millivolts. The logic circuit, however, typically requires 1 volt peak to peak. The drawback of the device of FIG. 1 is that it includes electrical connections and devices. The electrical components are sensitive to data transmission rates and should have sufficient electrical bandwidth to operate at the data transmission rate. As bit rates increase, obtaining amplifiers with the proper bandwidth becomes a challenge. While connections can be fabricated to accept the higher bit rates, such as in the range of gigabits, they must also be compatible with the amplifiers they inter-connect which traditionally have impedance ratings of 50 ohms. Accordingly, in light of ever increasing demand for higher data transfer rates, it is desirable to reduce the constraints created by the electrical elements in the circuit, e.g. transistors, capacitors and wiring.

SUMMARY OF THE INVENTION

Accordingly, the present invention is a direct detection device in which photodetectors and resistors replace all linear amplifiers. An optically amplified light wave is split along two paths: a clock recovery path and a data path. The light along the clock recovery path is detected by a first photodetector in series with a resistor $R_1$ where the resistance of $R_1$ is selected so as to provide a desired voltage at the circuit node common to the detector $R_1$ and the clock recovery device. The output from the clock recovery device is power split with one half being used to clock the decision circuit and the other half available for external use.

The light along the data path is also split a second time with each resulting path leading to a photodetector in series with a resistor, $R_2$ and $R_3$, respectively. Each of these photodetectors lead to an input in the decision circuit. One of the inputs to the decision circuit being the data and the other being an average DC voltage of the data signal. Each of the photodetectors is advantageously a p-i-n detector. It is also advantageous to fabricate a single chip to include the three photodetectors, their respective resistors, the clock recovery device and the decision circuit.

DETAILED DESCRIPTION OF THE INVENTION

As stated above, the underlying objective of the present invention is to remove the linear amplifiers from photodetector receivers. While devices which must receive the low voltage light wave detected by the photodetectors require a higher voltage at their input, this voltage magnification is easily accomplished by appending an optical amplifier before the photodetectors.

Figure 1:
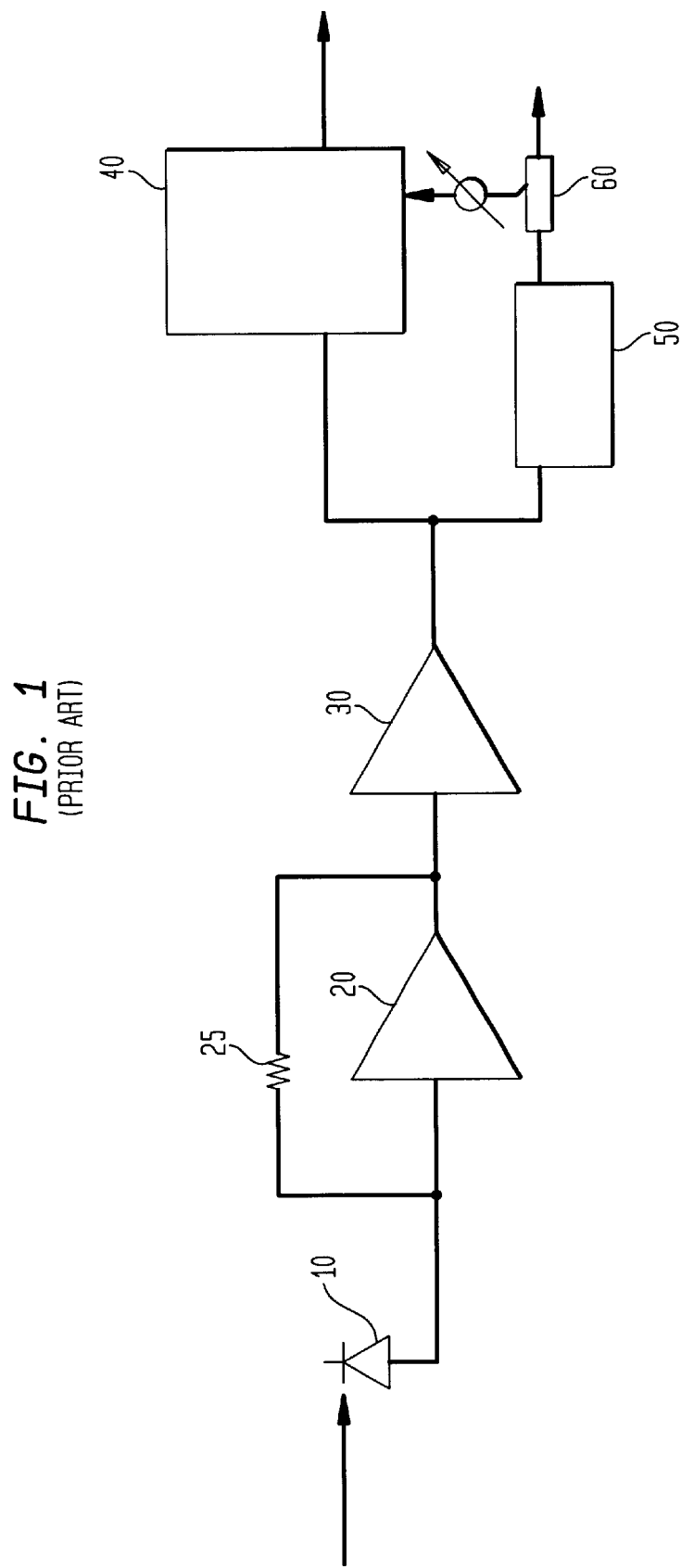
FIG. 1 illustrates a prior art direct detection device having linear amplifiers.
Figure 2:
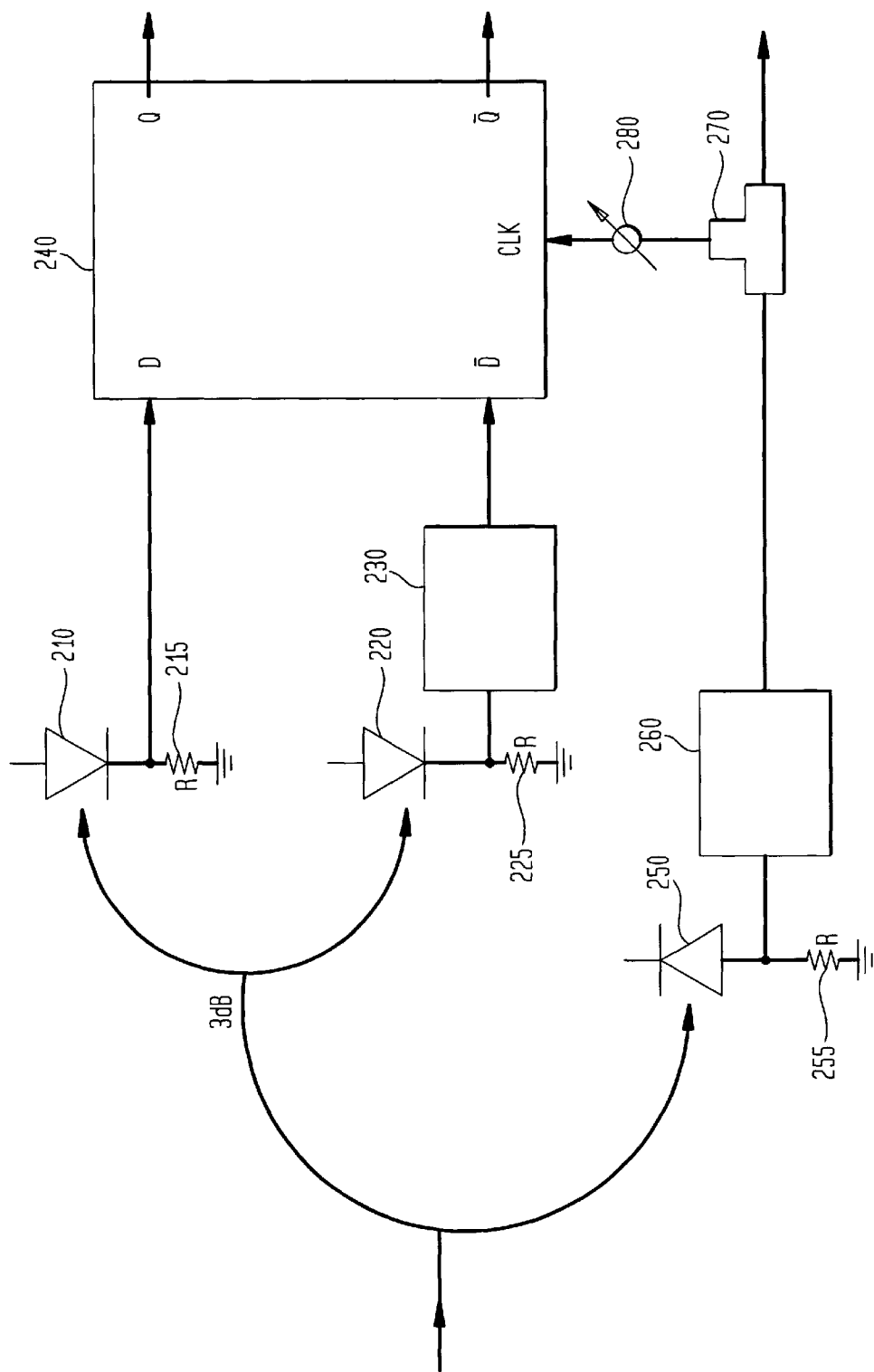
FIG. 2 illustrates an embodiment of the present invention with three photodetectors and resistors replacing the linear amplifiers of the devices of the prior art.

Referring to FIG. 2, a data carrying light wave is evenly split along two paths: a data path and a clock path. Referring first to the data path, the light wave along this path is evenly split a second time, one signal path leading to photodetector 210 and the other leading to photodetector 220. While prior art devices have two inputs into a decision circuit, the data signal and a complement signal, complement signals are created with differential electrical amplifiers which are not used in the device of the present invention. Rather, one of the two data paths are passed through low pass filter 230 to output an average DC voltage of the data signal, in lieu of the complement signal.

Each of the photodetectors are biased with a voltage $V_{pd}$ at one end and are connected at the other end by a resistor 215 and 225, respectively. When the lightwave is incident on photodetector 210, for example, a current $I_{ph}$ is induced across resistor 215 causing a voltage drop V across resistor 215 equal to the product of $I_{ph}$ and R. It is assumed in this example that all the resistors have the same resistance R, although this need not be the case. Typically, R is selected at 50 ohms as larger impedance will narrow the bandwidth.

Since the data input for decision circuit 240 and resistor 215 share a common node with photodetector 210, the voltage at that common node must be V. In systems where R is pre-set the particular voltage at the data input to decision circuit 240 will depend on the current $I_{ph}$ induced across resistor 215. $I_{ph}$ is a function of the power of the incident light wave and the responsivity of the photodetector 210. For a given photodetector 210 it may be necessary to amplify the light wave before it is incident on photodetector 210 in order to assure a sufficient current that will provide a large enough voltage into the decision circuit 240. Thus amplification is achieved without the traditional multi-step amplification process using electrical devices and their interconnections.

Methods and devices for amplification of light waves are well known in the art and those skilled in the art will readily understand how to apply those methods and devices to the single-chip wavelength converter of the present invention. For illustrative purposes, one such known class of optical amplification devices are known as EDFAs, or Eribium Doped Fiber Amplifiers which are glass fibers capable of 1000× amplification.

As mentioned at the outset, the input light wave is split into a data path and a clock path. We have discussed the data path. The clock path is necessary to recover the timing of the signal which may have become distorted as a result of the typically lengthy transmission distances the light travels. Methods of recovering the timing of the signal, i.e. clock recovery, are well known in the art and are applied to the data signal along the clock path as shown in block 260 to extract the timing information. In essence, block 260 converts the pulse data signal into a sinusoidal signal. This timing information is then typically split by power splitter 270 in order to provide the timing information to decision circuit 240 and to also provide an external clock source.

The sinusoidal signal going to decision circuit 240 is first aligned with the data signal using phase shifter 280. A properly aligned clock signal is necessary in order to extract clean output signals from decision circuit 240. Decision circuit 240 uses the timing information, cleans up the signal by removing much of the noise and outputs pulses corresponding to the data at Q and $\overline{Q}$ The benefits of the present invention will be readily apparent to those skilled in the art. For example, the present invention does not use or need high speed electrical connections external to the receiver. The receiver requires only one fiber lead for the optical input, three electrical output leads and two voltage bias leads. The high speed current voltage signals are confined internally and therefore eliminate any electrical mismatch, reflections, terminations, or connectors. In addition, the device is bit rate independent and wavelength independent.

In one advantageous embodiment of the present invention the direct detection receiver can be fabricated as a single device. The photodetectors may be fabricated on the same chip as the decision circuit using any known method including that taught in U.S. Pat. No. 5,063,426, hereby incorporated by reference as if fully set forth herein. While a variety of photodetectors may be used to construct the direct detection device of the present invention, in one advantageous embodiment the photodetectors are p-i-n photodetectors.

It may be possible to replace the three photodetectors of with two or even one photodetector and splitting the power after detection. It may even be possible to use more than three photodetectors. Any of these variations would be within the spirit of the present invention by taking advantage of the voltage drop across appropriately selected resistors in order to replace conventionally used linear amplifiers. However, it is currently believed that three photodetectors, one for each desired path, is most desirable as the redundancy reduces the amount of error that may be introduced by any one photodetector. If only one photodetector were used and it introduced an error, that error would be propagated throughout the receiver.

The foregoing merely illustrates the principles of the present invention. Those skilled in the art will be able to devise various modifications, which although not explicitly described or shown herein, embody the principles of the invention and are thus within its spirit and scope.

What is claimed is:

1. A direct detection receiver comprising:
   an input lead for receiving an optically carried data signal;
   at least one photodetector for detecting said optically carried data signal;
   a voltage bias lead to said photodetector;
   a power splitter for creating a data path and a clock recovery path for said data signal;
   a decision circuit for receiving said data signal from said data path to output a pulse signal corresponding to said data signal;
   a first resistor electrically connected at one end to a node in common with one of said photodetector and said decision circuit; and
   a clock recovery device for recovering timing information from said data signal to be input to said decision circuit, said clock recovery device acting upon said data signal along said clock recovery path.

2. The direct detection receiver of claim 1 wherein said at least one photodetector comprises:
   a first photodetector for detecting said data signal along said data path; and
   a second photodetector for detecting said data signal along said clock recovery path, wherein said clock recovery device acts upon said data signal detected by said second photodetector.

3. The direct detection receiver of claim 2 further comprising:
   a power splitter within said data path for splitting said data signal to continue along said data path and along a data complement path, said first photodetector for
   detecting said data signal along said continued data path;
   a third photodetector for detecting said data signal along said data complement path; and
   a low pass filter for outputting an average DC voltage signal of the data signal.

4. The direct detection receiver of claim 3 further comprising separate voltage bias leads for each of said photodetectors.

5. The direct detection receiver of claim 3 further comprising:
   a second resistor electrically connected at on end to a node in common with said second photodetector and said clock recovery device; and
   a third resistor electrically connected at on end to a node in common with said third photodetector and said low pass filter.

6. The direct detection receiver of claim 1 further comprising a power splitter along said clock recovery path for creating a first timing path leading to said decision circuit and a second timing path.

7. The direct detection receiver of claim 1 fabricated as a single integrated chip.

8. A direct detection method for receiving an optically carried data signal, comprising the steps of:
   detecting said optically carried data signal with at least one photodetector connected in series with a resistor R;
   power splitting said data signal to create a data path and a clock recovery path for said data signal;
   using a decision circuit to perform logical operations on said data signal from said data path to output a pulse signal corresponding to said data signal; and
   recovering timing information from said data signal along said clock recovery path to be input to said decision circuit.

9. The direct detection method of claim 8 further comprising the steps of:
   power splitting said optically carried data signal into a data path and a clock recovery path before detecting the data signal with said at least one photodetector;
   detecting with a first photodetector in series with a resistor, said data signal along said data path; and detecting with a second photodetector in series with a resistor, said data signal along said clock recovery path.

10. The direct detection method of claim 9 further comprising the steps of:

power splitting said data signal along said data path into a continued data path and a data complement path, said second photodetector for detecting said data signal along said continued data path;

detecting with a third photodetector in series with a resistor, said data signal along said data complement path; and low pass filtering said signal along said continued data path for a signal with an average DC voltage.

11. The direct detection method of claim 10 further comprising the step of separately voltage biasing each of said photodetectors.

12. The direct detection method of claim 8 further comprising the step of power splitting said data signal along said clock recovery path for creating a first timing path leading to said decision circuit and a second timing path.

13. The direct detection method of claim 8 further comprising the step of optically amplifying said optically carried data signal prior to any power splitting step.

* * * * *